United States Patent [19]

Ohkumo et al.

[11] Patent Number: 4,848,528
[45] Date of Patent: Jul. 18, 1989

[54] CONTROL SYSTEM FOR AN ELECTROMAGNETIC CLUTCH FOR A VEHICLE

[75] Inventors: Hiroya Ohkumo, Koganei; Ryuzo Sakakiyama, Tokyo, both of Japan

[73] Assignee: Fuji Jukogyo Kabushiki Kaisha, Tokyo, Japan

[21] Appl. No.: 31,941

[22] Filed: Mar. 27, 1987

[30] Foreign Application Priority Data

Mar. 31, 1986 [JP] Japan .................................. 61-73692

[51] Int. Cl.$^4$ ...................... B60K 41/02; F16D 37/02; F16D 27/16
[52] U.S. Cl. ............................... 192/0.032; 192/0.076; 192/21.5; 192/103 R; 364/424.1
[58] Field of Search ............... 192/0.032, 0.033, 0.052, 192/0.075, 0.076, 0.092, 0.096, 21.5, 103 R; 364/424.1

[56] References Cited

U.S. PATENT DOCUMENTS

| | | | |
|---|---|---|---|
| 3,402,793 | 9/1968 | Scholl | 192/0.033 |
| 4,494,641 | 1/1985 | Sakakiyama | 192/0.076 |
| 4,605,112 | 8/1986 | Takano | 192/0.033 |
| 4,675,817 | 6/1987 | Sakakiyama et al. | 192/0.032 X |
| 4,675,818 | 6/1987 | Miyawaki et al. | 192/0.032 X |
| 4,680,712 | 7/1987 | Sakakiyama et al. | 192/0.032 X |
| 4,688,665 | 8/1987 | Rowen | 192/0.076 |

FOREIGN PATENT DOCUMENTS

0151038 8/1985 European Pat. Off. .

Primary Examiner—Leslie A. Braun
Assistant Examiner—Richard M. Lorence
Attorney, Agent, or Firm—Martin A. Farber

[57] ABSTRACT

A system for controlling a drag torque of an electromagnetic clutch at idling operation of an engine for a motor vehicle with a continuously variable belt drive transmission. A detector is provided for detecting whether engine speed is higher or lower than a predetermined minimum idling speed. When the engine speed is at a higher engine speed, a standard current is passed in a coil of the clutch. At a lower idling speed, the drag current is gradually reduced until the engine speed increases to the predetermined minimum idling speed.

11 Claims, 7 Drawing Sheets

CONTROL SYSTEM FOR AN ELECTROMAGNETIC CLUTCH FOR A VEHICLE

BACKGROUND OF THE INVENTION

The present invention relates to a control system for an electromagnetic clutch for an automatic transmission of a motor vehcle.

An automobile provided with a continuously variable belt-drive transmission with an electromagnetic clutch is disclosed in EP-A No. 151038. The electromagnetic clutch of the transmission is controlled by a control system to provide various operational modes such as a starting mode of a vehicle, reverse excitation mode, drag mode, and mode of lock-up engagement. One of the modes is selected in accordance with a position of a selector lever and driving conditions to control the electromagnetic clutch.

In the drag mode, a small clutch current flows in a coil of the electromagnetic clutch when an accelerator pedal is released in a low vehicle speed range thereby applying a small drag torque to a driven member of the clutch. Accordingly, at a start of the vehicle, the power of an engine is properly transmitted to driving wheels through the transmission, so that the vehicle can be smoothly started.

However, the drag torque is exerted on the engine to reduce idling speed thereof. Accordingly, the drag torque is set to such a small value as to prevent a large reduction of the idling speed. However, the idling speed may decrease at cold engine operation or in a state of incorrect idling adjustment. In such a particular idling state, the drag torque is too large to maintain the idling speed, causing decrease of the speed or stalling of the engine.

SUMMARY OF THE INVENTION

The object of the present invention is to provide a system which controls the drag current in accordance with idling speed so as to maintain the idling speed.

In accordance with the present invention, there is provided a system for controlling a drag torque of an electromagnetic clutch at idling operation of an engine for a motor vehicle, having detecting means for detecting whether engine speed is higher or lower than a predetermined minimum idling speed and for producing a higher speed signal or a lower speed signal dependent on the detection, first means responsive to the higher speed signal for passing a standard drag current in a coil of the clutch, and said first means being responsive to the lower speed signal for gradually reducing the standard drag current until engine speed increases to the predetermined minimum idling speed.

The other objects and features of this invention will become understood from the following description with reference to the accompanying drawings.

DETAILED DESCRIPTION OF THE PREFERRED EMBODIMENT

Figure 1:
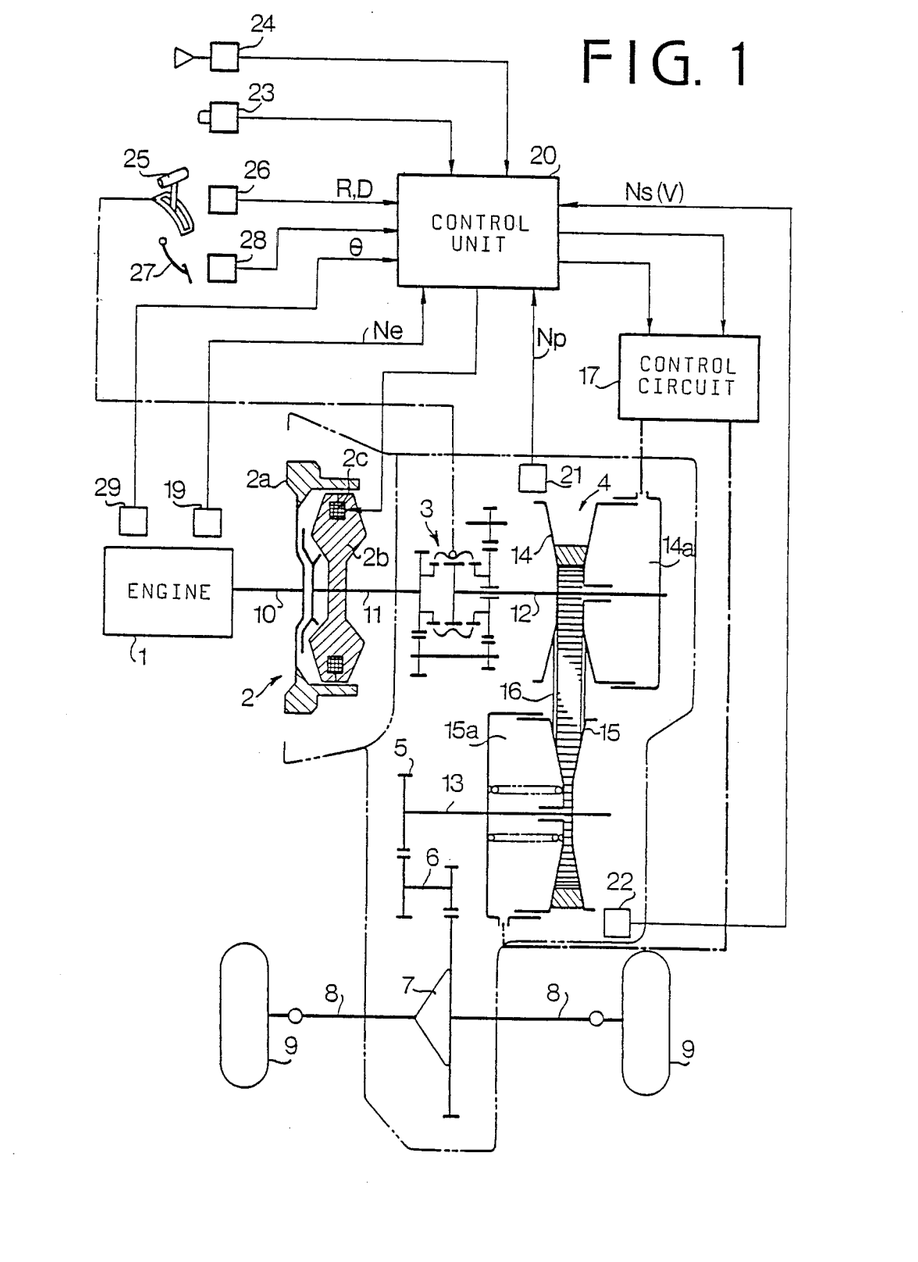
FIG. 1 is a schematic illustration of a system for controlling an electromagnetic clutch for a motor vehicle.

Referring to FIG. 1, a crankshaft 10 of an engine 1 is operatively connected to an electromagnetic powder clutch 2 for transmitting the power of the engine 1 to a continuously variable belt-drive automatic transmission 4 through a selector mechanism 3. The output of the belt-drive transmission 4 is transmitted to axles 8 of vehicle driving wheels 9 through an output shaft 13, a pair of intermediate reduction gears 5, an intermediate shaft 6, and a differential 7.

The electromagnetic powder clutch 2 comprises an annular drive member 2a connected to the crankshaft 10 of the engine 1, a driven member 2b secured to an input shaft 11 of the transmission 4, and a magnetizing coil 2c provided in the driven member 2b. Magnetic powder material is provided in a gap between the driven member 2a and driven member 2b. When the magnetizing coil 2c is excited by the clutch current, the driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive transmission 4, the selector mechanism 3 is provided between the input shaft 11 and a main shaft 12. The selector mechanism 3 is provided with a synchromesh mechanism comprising gears, hub, and sleeve for connecting the input shaft 11 and the main shaft 12 to selectively provide a driving position (D-range) and a reverse driving position (R-range).

The continuously variable belt-drive automatic transmission 4 has the main shaft 12 and the output shaft 13 provided in parallel with the main shaft 12. A drive pulley 14 provided with a hydraulic cylinder 14a is mounted on the main shaft 12. A driven pulley 15 provided with a hydraulic cylinder 15a is mounted on the output shaft 13. A drive belt 16 engages with the drive pulley 14 and the driven pulley 15. Hydraulic cylinders 14a and 15a are communicated with an oil hydraulic control circuit 17. The hydraulic control circuit 17 is responsive to vehicle speed, engine speed and throttle valve position for controlling the amount of oil supplied to the cylinders 14a and 15a. The pulleys 14 and 15 are operated by compressive forces in the cylinders so that the running diameter of belt 16 is varied to infinitely change the transmission ratio.

An electronic control system for the clutch 2 and the belt-drive transmission 4 has an engine speed sensor 19, and rotating speed sensors 21 and 22 for respectively sensing the speeds of the drive pulley 14 and the driven pulley 15. A choke switch 24 produces an output signal when a choke valve of the engine 1 is closed, and an air conditioner switch 23 produces an output signal at the operation of an air conditioner. A selector lever 25 connected to the selector mechanism 3 is provided with a select position sensor 26 for sensing a drive position D and a reverse position R. An accelerator pedal switch 28 is provided for sensing the depression of an accelerator pedal 27, and a throttle position sensor 29 is provided.

Output signals of the sensors and pulses of the switches are applied to an electronic control unit 20 which produces a clutch current control signal which is sent to the clutch 2 and a control signal for controlling the transmission ratio (i) and a line pressure control signal which are sent to the control circuit 17.

Figure 2A:
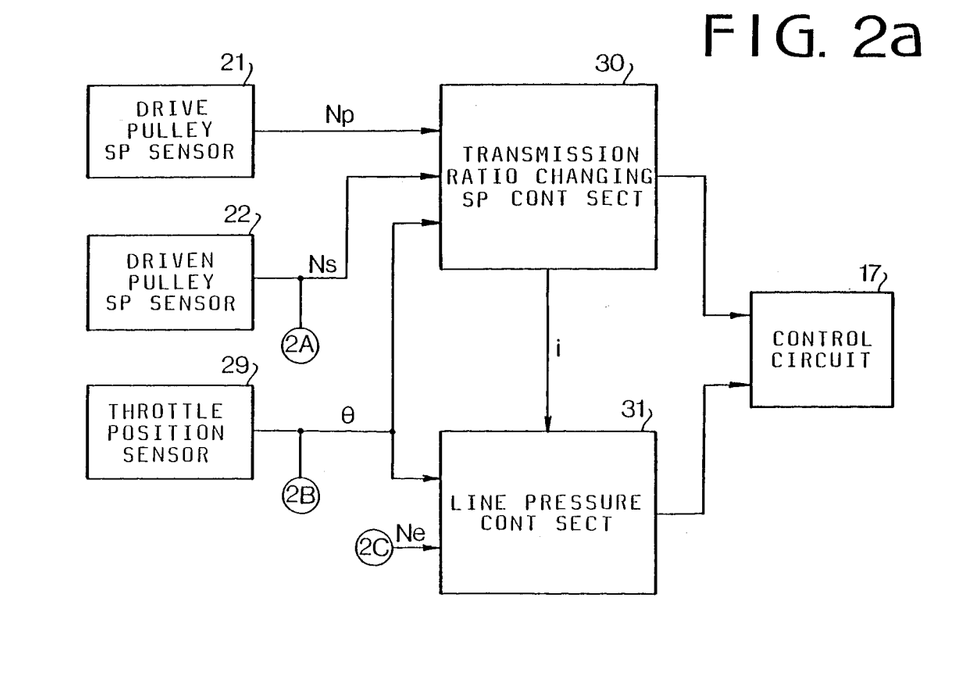
FIGS. 2a and 2b show a block diagram of a control unit according to the present invention.
Figure 2B:
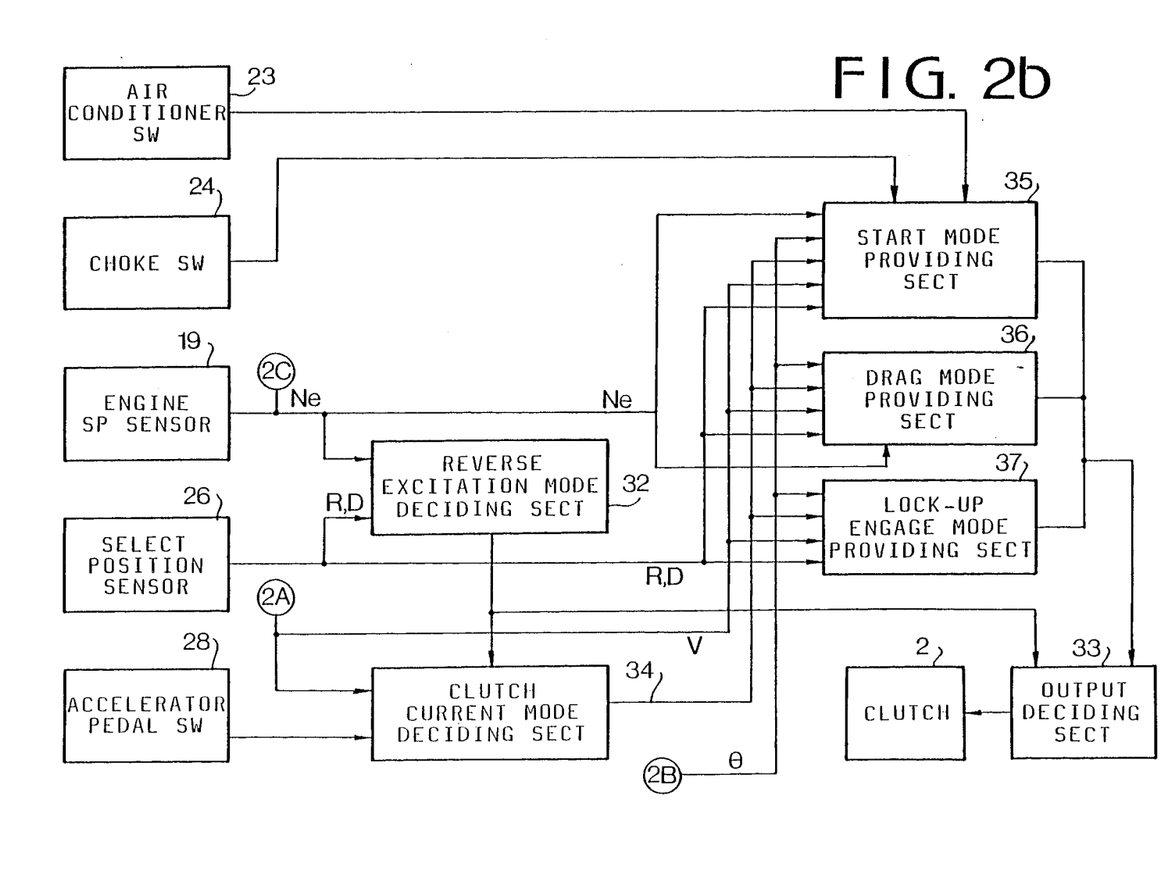

Referring to FIGS. 2a and 2b showing the control unit 20 of FIG. 1, a transmission ratio changing speed control section 30 is applied with a drive pulley speed signal $N_P$ of the sensor 21, driven pulley speed signal Ns of the sensor 22, and throttle position signal $\theta$ of the sensor 29 to produce the transmission ratio control signal dependent on a desired transmission ratio changing speed di/dt. A line pressure control section 31 is applied with an engine speed signal Ne of the sensor 19, throttle position signal $\theta$ of the sensor 29, actual transmission speed ratio signal i ($N_s/N_P$) of the transmission ratio changing speed control section 30 to produce the line pressure control signal dependent on a desired line pressure. These control signals are applied to the control circuit 17 to control the transmission ratio and line pressure of the transmission 4.

A reverse excitation mode deciding section 32 is applied with engine speed signal Ne of the sensor 19 and drive position signal of the select position sensor 26. When the engine speed Ne is below 300 rpm, or the selector lever 25 is at a neutral position (N-range) or a parking position (P-range), the reverse excitation mode deciding section 32 produces a reverse excitation signal which is applied to an output deciding section 33, so that a small reverse current flows in the clutch 2 to release the clutch completely.

A clutch current mode deciding section 34 is applied with signals from the reverse excitation mode deciding section 32 and accelerator pedal switch 28, and vehicle speed signal V from driven pulley speed sensor 22 for deciding driving conditions such as starting mode to produce output signals. The output signals are applied to a start mode providing section 35, drag mode providing section 36, and clutch lock-up engage mode providing section 37.

The start mode providing section 35 decides clutch current of a starting characteristic dependent on the engine speed Ne at ordinary start or at closing of the choke switch 24 or air conditioner switch 23. The starting characteristic is corrected by signals from the throttle valve opening degree $\theta$, vehicle speed V, and driving positions of the D-range and R-range.

The drag mode providing section 36 decides a small drag current when the accelerator pedal 27 is released at a low speed in each drive position for providing a drag torque to the clutch 2 for smooth starting of the vehicle.

Figure 3:
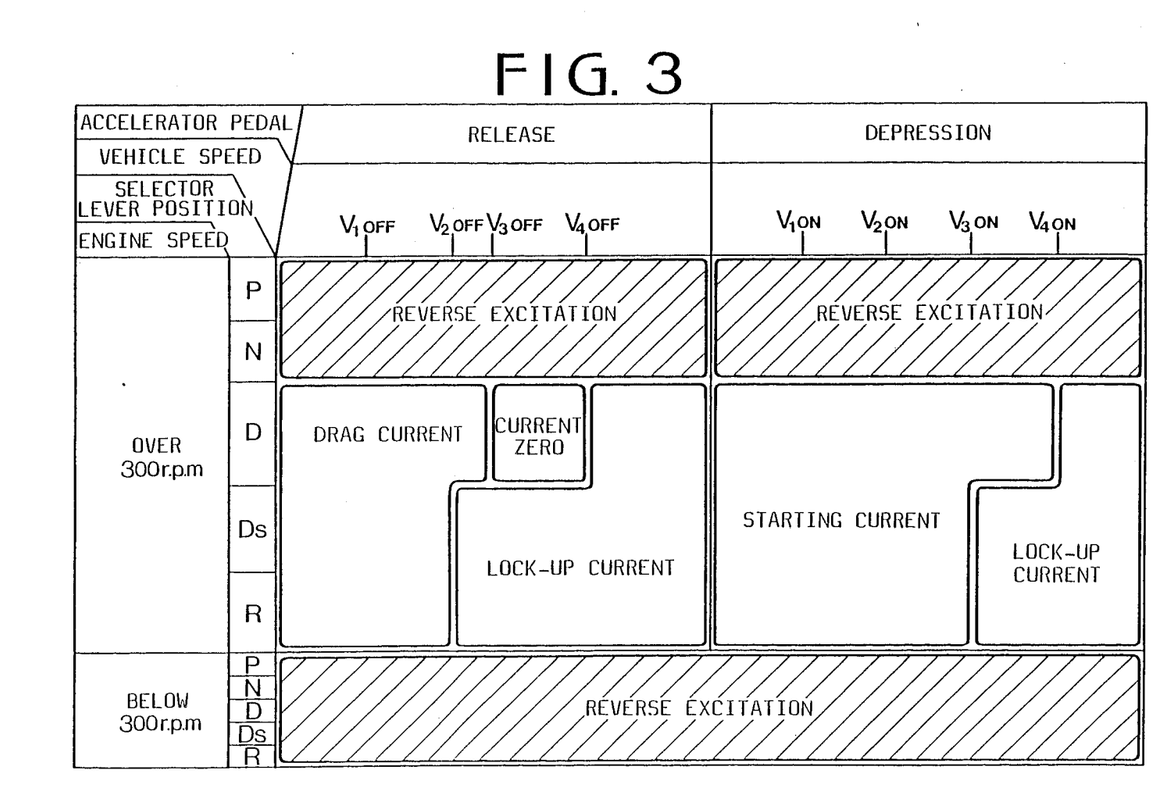
FIG. 3 is a graph showing regions of various modes.

The clutch lock-up engage mode providing section 37 decides a lock-up current in response to the vehicle speed V and throttle opening degree $\theta$ at each drive position for entirely engaging the clutch 2. Outputs of sections 35, 36 and 37 are applied to the output deciding section 33 to control the clutch current. A range of each mode is shown in FIG. 3.

Figure 4A:
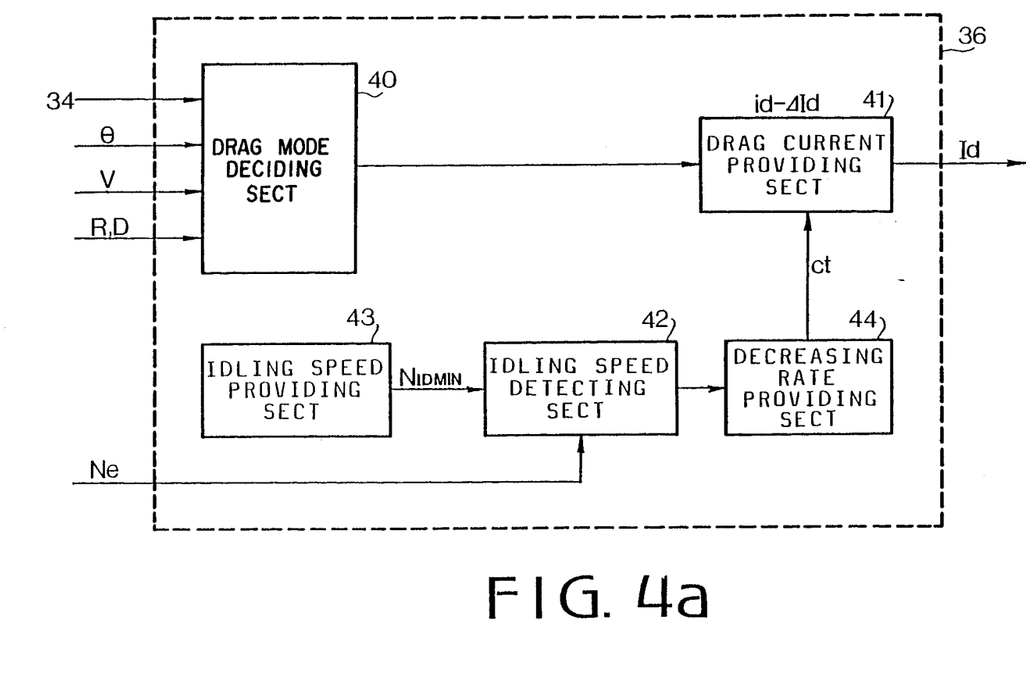
FIG. 4a is a block diagram of a main part of the system according to the present invention.

Referring to FIG. 4a, the drag mode providing section 36 is provided with a drag mode deciding section 40 applied with output signals of the throttle valve opening degree $\theta$, vehicle speed V, drive position R-range and D-range, and clutch current mode deciding section 34. The drag mode deciding section 40 produces a drag signal which is sent to a drag current providing section 41 for determining a drag current id and particularly of a value of a standard drag current ID for providing a standard drag torque. An idling speed detecting section 42 is applied with engine speed signal Ne. A minimum idling speed providing section 43 provides a minimum idling speed $N_{IDMIN}$ which is a minimum value for keeping a stable idling below a standard idling speed $N_{ID}$. The idling speed detecting section 42 detects whether the engine speed Ne is above or equal to the minimum idling speed $N_{IDMIN}$ (Ne $\geq N_{IDMIN}$), or below the minimum idling speed $N_{IDMIN}$ (Ne $< N_{IDMIN}$), and produces a resultant signal. The signal is applied to a decreasing rate providing section 44 for providing a drag current decreasing signal ct which is applied to the drag current providing section 41.

Figure 4B:
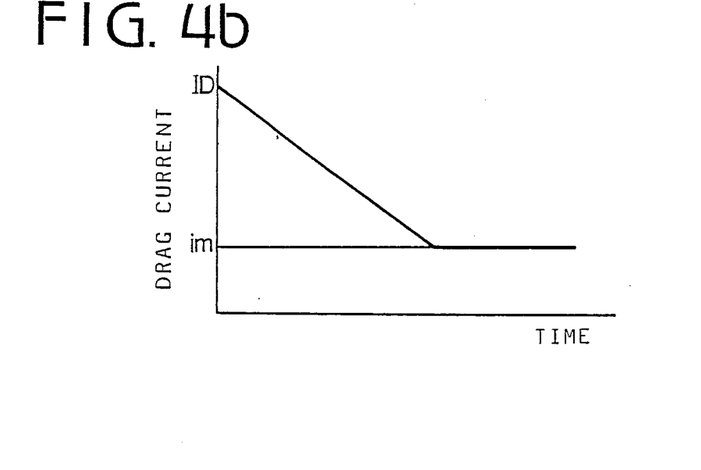
FIG. 4b is a graph showing a variation of drag current.

Referring to FIG. 4b, the drag current gradually decreases from the standard drag current ID to a minimum drag current im. When the engine speed Ne is above or equal to the minimum engine speed $N_{IDMIN}$, the decreasing signal ct is zero. When the engine speed Ne is below the minimum engine speed $N_{IDMIN}$, the drag current ID gradually decreases at the rate shown in FIG. 4b.

Figure 5:
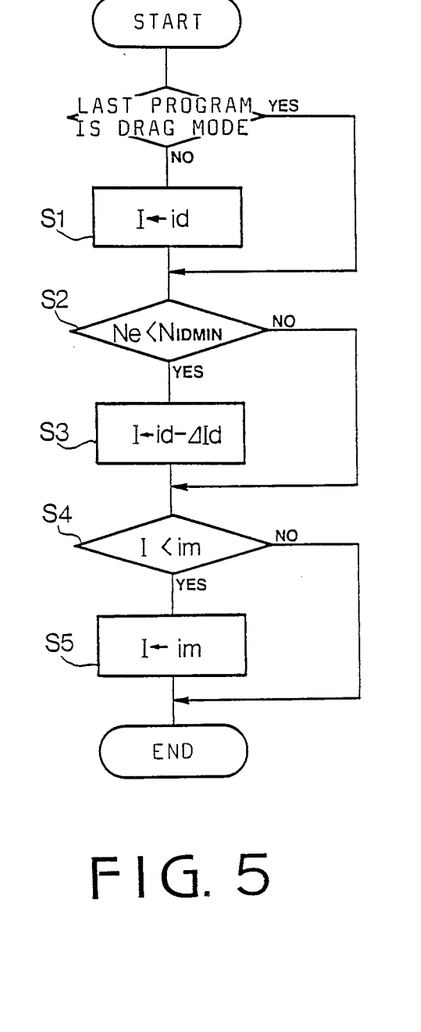
FIG. 5 is a flow chart showing the operation of the system.
Figure 6A:
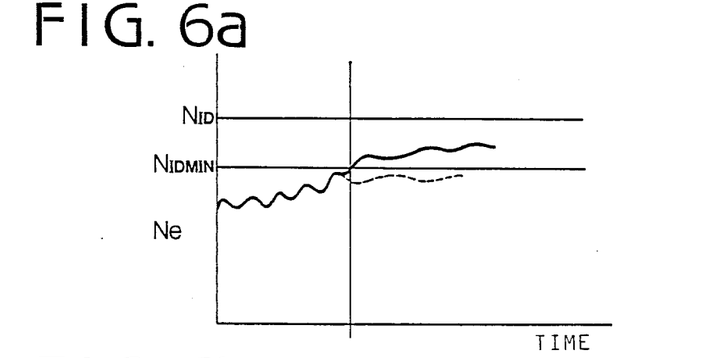
FIGS. 6a and 6b are graphs showing drag current characteristics.
Figure 6B:
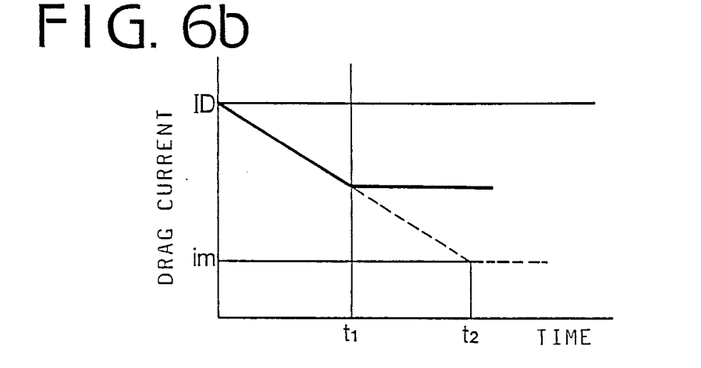

Describing the operation of the system with reference to FIGS. 4a and 5, the program is repeated at regular intervals. When the mode of the clutch is changed to the drag mode just before a program, clutch current I is changed to the drag current id at a step S1 by the signal Id from the drag current providing section 41. At a step S2, engine speed Ne is compared by the idling speed detection section 42. As shown in FIG. 6a, 6b, when the engine speed is unstable before a time t1, and the engine speed Ne is below the minimum idling speed $N_{IDMIN}$, the drag current id is reduced by $\Delta$ Id at a step S3. When engine speed Ne is higher than minimum speed $N_{IDMIN}$ at step S2 and the drag current Id is larger than the minimum current im at a step S4, the program ends. If not, the drag current Id is gradually increased to the minimum value im at a step S5. When the drag current reduces at step S3 the load on the engine decreases by the reduction of the drag torque so that the engine speed Ne increases. As shown by a solid line of FIG. 6a, when the engine speed Ne becomes higher than $N_{IDMIN}$ at time t1, the drag current is held to the value at the time. As shown by dotted line, if the engine speed is maintained below the minimum engine speed $N_{IDMIN}$, and the drag current Id goes to the minimum current im at time t2, the minimum current im is held to keep a minimum drag torque.

Thus, in accordance with the present invention, the engine is kept in idling state without stalling even if the idling speed is at a low value.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for controlling a drag torque of an electromagnetic clutch operatively connected to a continuously variable belt-drive transmission at idling operation of an engine for a motor vehicle, the system comprising:
   detecting means for detecting whether idling engine speed is higher or lower than a predetermined minimum idling speed and for producing a higher speed signal when the engine speed is higher than the minimum idling speed and for producing a lower speed signal when the engine speed is lower than the minimum idling speed;

drag current providing means for supplying a drag current to a coil of the clutch when an accelerator pedal of the vehicle is released in a low vehicle speed range including zero speed; and means responsive to the lower speed signal for causing the drag current providing means to gradually reduce the drag current during idling operation of the engine until engine speed increases to the predetermined minimum idling speed.

2. A system according to claim 1, wherein
said minimum idling speed is a minimum value for keeping stable idling of the engine below a standard idling speed.

3. In a system for controlling drag torque of a current-controlled clutch at idling operation of an engine for a motor vehicle, having an engine speed sensor for producing an engine speed signal responsive to rotational speed of the engine, the clutch being connected to the engine, the improvement of the system which comprises, drag mode deciding means for producing a drag signal representing a standard drag torque when an accelerator pedal for the engine mounted on the vehicle is released in a low vehicle speed range, drag current providing means for producing a drag current for the clutch corresponding to the drag signal;

means for storing a minimum idling speed for stable idling below a standard idling speed, and decreasing rate providing means for producing a drag current decreasing signal to gradually decrease the drag current when the engine speed is lower than the minimum idling speed.

4. A method for controlling a drag torque of an electromagnetic clutch operatively connected to a transmission at idling operation of an engine for a motor vehicle, the method comprising the steps of initially providing a standard drag current for the clutch under predetermined operating conditions comprising release of an accelerator of the vehicle, and reducing the drag current under said predetermined operating conditions when engine speed is lower than a minimum idling speed for keeping stable idling of the engine below a standard idling speed.

5. A method according to claim 4, further comprising the step of maintaining the drag current constant at an instantaneous value under said operating conditions when the engine speed is no longer lower than said minimum idling speed.

6. A method according to claim 4, wherein
said reducing of the drag current continues under said operating conditions and under said condition of the engine speed being lower than said minimum idling speed until the drag current reaches a minimum drag current.

7. A method according to claim 4, further comprising the step of increasing the drag current to a predetermined minimum drag current under said operating conditions if the drag current drops less than said minimum drag current.

8. A method according to claim 4, wherein
said reducing of the drag current is at a constant rate independent of the value of the engine speed as long as the engine speed is lower than said minimum idling speed.

9. A method according to claim 4, wherein
said operating conditions comprise low vehicle speed.

10. A method according to claim 9, wherein
said operating conditions comprise the transmission being in drive or reverse operating mode.

11. A method according to claim 10, wherein
said operating conditions comprise engine speed being above a predetermined value which is lower than said minimum idling speed.

* * * * *